United States Patent [19]

Martinelli

[11] 4,354,213
[45] Oct. 12, 1982

[54] SELF-LUBRICATING LINER

[75] Inventor: Lawrence G. Martinelli, San Jose, Calif.

[73] Assignee: Verbatim Corporation, Sunnyvale, Calif.

[21] Appl. No.: 155,434

[22] Filed: Jun. 2, 1980

[51] Int. Cl.³ ............... G11B 5/016; G11B 23/02; G11B 5/72
[52] U.S. Cl. .................................. 360/133; 360/99; 360/128; 428/900
[58] Field of Search ............... 360/133, 135, 99; 428/900, 928, 64–65, 421; 206/444; 427/127–131

[56] References Cited

U.S. PATENT DOCUMENTS

| | | | |
|---|---|---|---|
| 3,668,658 | 6/1972 | Flores et al. | 360/133 |
| 3,864,755 | 2/1975 | Hargis | 360/133 |
| 4,065,798 | 12/1977 | Sugisaki et al. | 360/128 |
| 4,087,582 | 5/1978 | Shirahata et al. | 428/900 |
| 4,106,067 | 8/1978 | Masuyama et al. | 360/133 |
| 4,172,176 | 10/1976 | Tanaka et al. | 360/135 |
| 4,188,434 | 2/1980 | Loran | 360/135 |
| 4,223,361 | 9/1980 | Zaitsu et al. | 360/133 |
| 4,239,828 | 12/1980 | Knope et al. | 428/900 |
| 4,251,843 | 2/1981 | Masuyama et al. | 360/133 |

Primary Examiner—Alfred H. Eddleman
Attorney, Agent, or Firm—Thomas E. Schatzel

[57] ABSTRACT

An improved floppy disk having a liner material into the fibers of which has been compounded identically the same lubricant as that compounded into the surface of the magnetic recording disk.

6 Claims, 2 Drawing Figures

U.S. Patent  Oct. 12, 1982  4,354,213
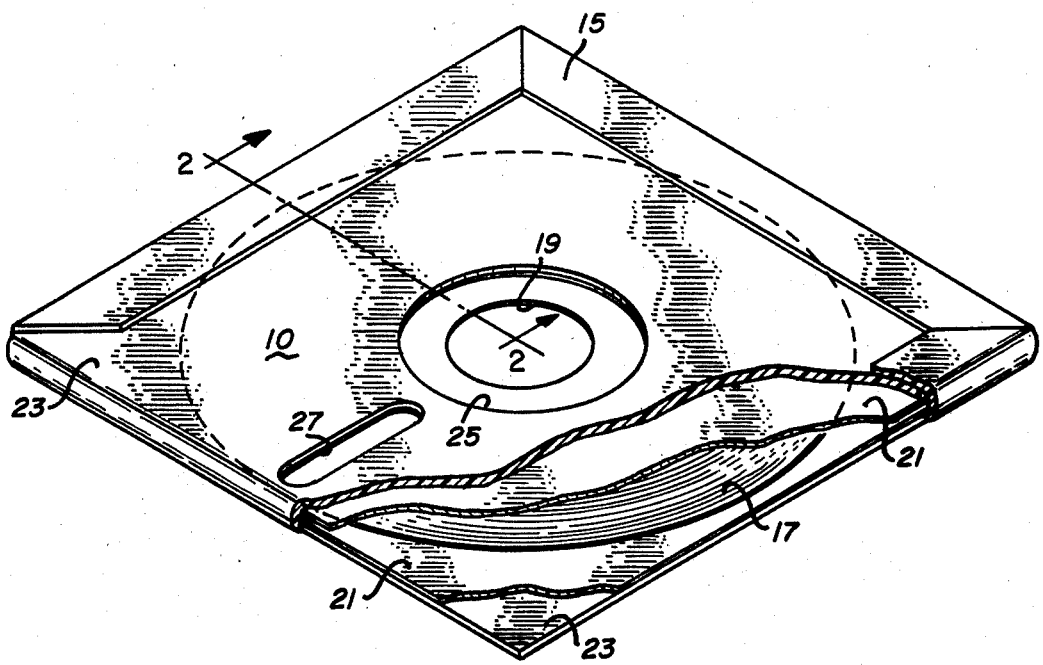
Fig_1
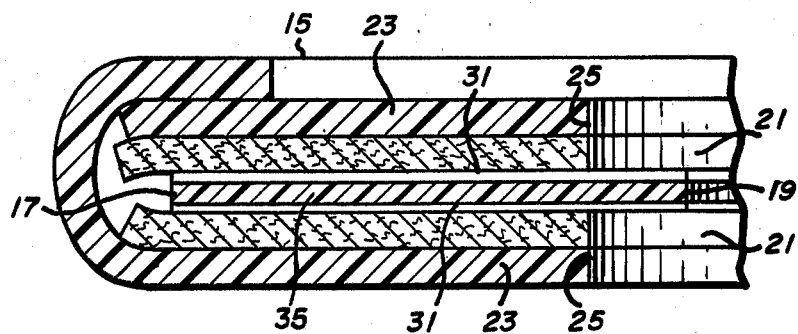
Fig_2

SELF-LUBRICATING LINER

BACKGROUND OF THE INVENTION

1. Field of the Invention

The present invention relates generally to fibrous materials into which a lubricant has been compounded and more particularly to liner materials for magnetic record disk assemblies in which the porous, fibrous, low-friction anti-static liner material has a lubricant compounded into it.

2. Description of the Prior Art

Widely used in the computer industry is a data storage medium comprised of a circular disk of flexible material coated with magnetic particles enclosed within an envelope. These disks are known in the trade as "floppy disks." The envelope material is fabricated by bonding together a layer of porous, fibrous, low-friction, anti-static material and a layer of solid material. Both a method of constructing these envelopes and one type of porous, fibrous, low-friction, anti-static liner material are taught in U.S. Pat. No. 3,668,658 issued to Flores, et al.

Currently the porous, fibrous, low-friction, anti-static liner material is fabricated by bonding together a loose mass of synthetic fibers. Within the category of materials fabricated in the foregoing manner, there are two materials made from different compositions of fibers and formed into a whole mass in different ways, currently in wide use as floppy disk liner materials. The first kind includes a mixture of 70% to 80% rayon fibers with 30% to 20% polypropylene fibers. The polypropylene fibers have a lower softening temperature than the rayon fibers. Thus, a loose mixture of these fibers is normally bound into a cohesive layer by heating such a mass of fibers to the temperature at which the polypropylene fibers soften and adhere to each other and also the rayon fibers and then cooling the resultant material. The second type of material used for floppy disk liners includes almost entirely polyester fibers. This type of fiber is formed into a cohesive layer by applying a liquid binder solution containing, in addition to other substances, polyester molecules and a catalyst, to a mass of loose fibers. This coated mass of fibers is then further processed to polymerize certain components in the binder solution yielding a cohesive layer of bound fibers comprising approximately 93% polyester fibers and 7% polyester terpolymer binder. The polyester terpolymer binder is formed by the polymerization of the polyester molecules contained in the binder solution applied to the loose fiber mass.

The porous, fibrous, low-friction, anti-static materials when used as the liner of floppy disk envelopes are in intimate contact with the circular disk of flexible material coated with magnetic particles. These materials are employed to permit the disk to rotate easily within the envelope and, in addition, clean its recording surfaces of dust, wear products and airborne contaminants. During normal operation, the circular disk of flexible material coated with magnetic particles rotates constantly in frictional contact with the porous, fibrous, low-friction, anti-static liner material and, in addition, is in periodic frictional contact with one or more magnetic transducers used to write data to and read data from the circular disk of recording material. These frictional contacts to the circular disk of recording material both increase the amount of force required to rotate the circular disk of recording material within the envelope and, in addition, ultimately cause the coating of magnetic particles to wear away. For this reason, it is standard practice within the industry to compound lubricants into the coating containing magnetic particles applied to the circular disk of flexible material. However, it is generally difficult to maintain a stabilized concentration of this lubricant at the surface of the flexible disk of recording material over the life of the floppy disk assembly due to the wick action of conventional liner materials which act so as to continuously draw lubricant from the surface coating of the flexible disk.

Previous attempts to control the concentration of lubricant at the surface of the coating have consisted in dispersing a lubricant into the pores of the liner material formed when the constitutent fibers are bonded together. Such attempts to saturate the liner material with lubricant are exemplified by German Pat. No. 25 45 091 issued to Minnesota Mining and Manufacturing Co., U.S. Pat. No. 4,065,798 issued to Sugisaki, et al. and U.S. Pat. No. 4,106,067 issued to Masuyama, et al. The German Patent teaches the application of highly fluorine alkyl polyether to the liner material by pulling long strips of that material continually through a vat containing a mixture of the polyether dissolved in a solvent. Both the Sugisaki et al, and the Masuyama et al patents teach soaking the liner material with either a silicone resin, Teflon, a silicone oil, etc., in order to reduce the friction between the rotating disk of material and the envelope liner material.

SUMMARY OF THE INVENTION

An object of the present invention is to provide an improved floppy disk liner material into which a lubricant is compounded at the time the material is fabricated.

Another object of the present invention is to provide an improved floppy disk liner material in which the lubricant concentration is relatively independent of density of fibers in the liner material.

Another object of the present invention is to provide an improved floppy disk assembly in which the liner has a lubricant identical to that compounded into the magnetic coating applied to the circular disk of flexible material compounded into it.

Another object of the present invention is to provide an improved floppy disk assembly in which the concentration of lubricant at the surface of the flexible disk of recording material is relatively stable.

Another object of the present invention is to provide an improved floppy disk assembly in which a relatively stable concentration of lubricant at the surface of the flexible disk of recording material can be established and controlled at the time the floppy disk assembly is manufactured.

Briefly, this invention pertains to the fabrication and use of floppy disk liner materials in which a lubricant was compounded either at the time the fibers in that material were extruded or at the time they were bound together into a cohesive layer.

An advantage of the present invention is that the concentration of lubricant at the surface of the fibers is relatively independent of the porosity of the bonded fibers and of the affinity of the lubricant for the fiber material but rather depends primarily upon the materials used to compound either the fiber and/or their binder, if any.

A second advantage is that the choice of lubricant and its relative concentration within the liner material are independent of the affinity which the lubricant has for the fiber material of the liner thereby permitting the inclusion of the same lubricant material both in the liner material and in the coating containing magnetic particles applied to the circular disk of flexible material.

These and other objects and advantages of the present invention will no doubt become obvious to those of ordinary skill in the art after having read the following detailed description of the preferred embodiments as illustrated in the various drawing figures.

IN THE DRAWING

FIG. 1 is a perspective, partially sectioned view of a floppy disk assembly of the present invention; and FIG. 2 is a cross-section view along the line 2—2 of the floppy disk assembly shown in FIG. 1.

DETAILED DESCRIPTION OF THE PREFERRED EMBODIMENT

FIG. 1, illustrates a floppy disk assembly referred to by the general reference number 10. The assembly 10 includes an envelope 15 and a circular disk 17. The circular disk 17 has a circular aperture 19 concentric with that of the circular disk 17. The envelope 15, into which the circular disk 17 is inserted and sealed, is formed from a sheet of material fabricated by bonding a liner 21 of a layer of porous, fibrous, low-friction, anti-static material, to a layer of solid material 23. The envelope 15 has a circular aperture 25 located at its center and larger in diameter than the circular aperture 19 in the circular disk 17, and an oval aperture 27 located symmetrically along a line from the center of the circular aperture 25 orthogonal to a side of the envelope 15. When installed in a device adapted for recording and reproducing information on the circular disk 17 and in operation, a means for rotating the circular disk 17 passes through the circular aperture 25 and partially through the circular aperture 19 thereby engaging the circular disk 17 and rotating it about its center. When information is to be recorded or reproduced from the circular disk 17, a transducing means is inserted through the oval aperture 27 and contacts the surface of the circular disk 17.

The circular disk 17 has a thin coating 31. The coating 31 comprises small particles of magnetic material, a binder and a lubricant. This material is applied as a thin coating, e.g. 35 micro inches, to one or both sides of a sheet of flexible material 35. After the coating and other subsequent fabrication operations have been performed, the lubricant, compounded into the coating 31 prior to its application to the sheet of flexible material 35, establishes a certain concentration in the surface layer of the exposed side of the coating 31. If lubricant is continuously or often repeatedly extracted from this surface layer of the coating 31, a continual or intermittent diffusion of additional lubricant from the volume of the coating 31 to the exterior surface layer will occur attempting to maintain the surface layer lubricant concentration which existed prior to initiating such lubricant extraction. Because of the thinness of the coating 31, this continuous or intermittent diffusion of lubricant from the volume of the coating to the surface layer will ultimately significantly reduce the lubricant concentration within the volume of the coating 31. This will alter the properties of the lubricant in the surface layer from those which existed prior to commencement of lubricant extraction. If lubricant extraction from the surface of the coating 31 is continued at a rapid enough rate for a sufficiently long period of time, the coating can become essentially entirely depleted of lubricant.

Insertion of the coated circular disk 17 into the envelope 15 and thereby into intimate, frictional contact with the liner 21 containing no lubricant identical to that compounded into the coating 31 immediately initiates the extraction of lubricant from the surface layer of the coating 31. The ultimate concentration of lubricant in the surface layer of the coating 31 and the length of time before that concentration becomes established is a complex problem involving primarily the affinity of the lubricant for the materials compounded into the coating 31, the affinity of the lubricant for the materials bonded together in the liner 21, the temperatures to which the floppy disk assembly 10 is exposed and the duration of such exposure. The technical complexity of this problem and the inability to control the environment to which the floppy disk assembly 10 is exposed once it departs the manufacturing site severely limits the prior potential for control of the surface concentration of lubricant in the coating 31.

By fabricating the liner 21 of the envelope 15 from a layer of porous, fibrous, low-friction, anti-static material containing an appropriate fraction of lubricant, identical to that compounded into the coating 31, the process by which lubricant is extracted from the surface layer of the coating 31 can be more precisely controlled and even suppressed. The inclusion of properly chosen fractions of identically the same lubricant in both the coating 31 and the material of the liner 21, allows the state of equilibrium between lubricant being extracted from the surface layer of the coating 31 by liner 21 and the similar converse extraction of lubricant from the surface layer of the liner 21 by the coating 31 to be established much more rapidly. The ability to rapidly establish this equilibrium between these two competing extraction processes permits tighter control and prediction of the equilibrium concentration of lubricant in the surface layer of the coating 31 at the time the floppy disk assembly 10 is manufactured despite any inability to control the environment to which the floppy disk assembly 10 is exposed once it departs the manufacturing site.

Lubricants currently used in compounding the coating 31 include, for example, long chain fatty acids and long chain fatty acid esters of hydrocarbons having twelve or more carbon atoms. These same lubricants can be infused into the fibers of the liner 21. Infusion can be accomplished by bonding together a mixture of rayon and polypropylene fibers or the material fabricated almost entirely from polyester fibers, and compounding the lubricant into the material from which those fibers are extruded. Alternatively, when the liner 21 is made almost entirely from polyester fibers, the lubricant can be fixed into the material by compounding the lubricant into the binder solution prior to applying it to the mass of loose fibers. By employing either of these two means for incorporating the lubricant into the liner 21, the concentration of lubricant compounded into either the fibers, or the fibers and/or binder, can be relatively independent of the density of fibers bound together, the porous structure of the bound mass or the affinity of the lubricant for the fiber material.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An improved floppy disk assembly of the type having a circular disk of magnetic recording material enclosed within an envelope formed from material fabricated by bonding together a layer of porous, fibrous, low-friction, anti-static material and a layer of solid material, wherein the improvement comprises employing porous, fibrous, low-friction, anti-static liner material into which a lubricant, identical to that compounded into the coating of the circular disk of flexible material, has been compounded.

2. An improved floppy disk assembly of the type having a circular disk which has been coated with magnetic recording material and where the disk is enclosed within an envelope formed with an interior fibrous liner contacting the surface of the disk, the improvement comprising, in combination:

a lubricant incorporated into the magnetic recording material coating on the disk in such a manner so as to allow its migration to the surface of the disk to provide lubrication between the disk and everything which it contacts; and a lubricant incorporated into the fibrous lining of the envelope which is of the identical type as the lubricant incorporated into the coating on the disk, and incorporated in a manner so as to allow its migration to the surface of the liner and providing a lubricant layer wherever the liner is in contact with the disk, and further, incorporated in a quantity such that the concentration of lubricant at the surface of the fiberous liner corresponds to the concentration of lubricant on the surface of the disk to establish an equalibrium in the normal migration of lubricant from the disk to the fibrous liner and from the fibrous liner to the disk;

whereby the net transfer of lubricant across the contacting interface between the disk and the fibrous liner is essentially zero, and the concentration of lubricant on the surface of the disk remains stable over extended periods of time and operation of the floppy disk assembly.

3. The improvement of claim 2 wherein
the lubricant is a fatty acid having twelve or more carbon atoms.

4. The improvement of claim 2 wherein
the lubricant is a fatty acid ester of a hydrocarbon having twelve or more carbon atoms.

5. The improvement of claim 2 wherein
the lubricant is infused with the individual fibers of the liner rather than applied in patches or globules.

6. The improvement of claim 2 wherein
the individual fibers of the fibrous liner are bound together by a binder material pervading the fibrous liner and the lubricant is dispersed throughout the liner conjunctively with said binder material.

* * * * *